(12) United States Patent
Tamura et al.

(10) Patent No.: US 6,558,636 B2
(45) Date of Patent: May 6, 2003

(54) PLASMA TYPE EXHAUST GAS CLEANING APPARATUS

(75) Inventors: Yasuki Tamura, Nisshin (JP); Kojiro Okada, Nagoya (JP); Kazuo Koga, Okazaki (JP); Osamu Nakayama, Toyota (JP); Keisuke Kawamura, Nagasaki (JP); Kiyoshi Kawamura, Komaki (JP)

(73) Assignees: Mitsubishi Jidosha Kogyo Kabushiki Kaisha, Tokyo (JP); Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/768,258

(22) Filed: Jan. 25, 2001

(65) Prior Publication Data

US 2001/0023589 A1 Sep. 27, 2001

(30) Foreign Application Priority Data

Jan. 27, 2000  (JP) ........................................ 2000-018749

(51) Int. Cl.[7] ............................................... B01J 19/08
(52) U.S. Cl. .............. 422/186.04; 422/186; 422/186.07
(58) Field of Search ........................... 422/186, 186.04, 422/186.07

(56) References Cited

U.S. PATENT DOCUMENTS 6,264,897 B1 * 7/2001 Ishioka et al. ......... 422/186.07

FOREIGN PATENT DOCUMENTS

| DE | 195 18 970 C1 | 11/1996 | |
|---|---|---|---|
| DE | 195 34 950 A1 * | 3/1997 | ............ A62D/3/00 |
| JP | A559934 | 3/1993 | |

* cited by examiner

Primary Examiner—Nathan M. Nutter
Assistant Examiner—Thao Tran
(74) Attorney, Agent, or Firm—Birch, Stewart, Kolasch & Birch, LLP (57) ABSTRACT

The present plasma type exhaust gas cleaning apparatus comprises a dielectric (5) arranged between a discharge electrode (7) and a ground electrode (8). The dielectric has a plurality of independent cavities (6) formed therein. The exhaust gas from combustion equipment (1) flows through the interiors of the plurality of independent cavities (6). Thus, in the plasma type exhaust gas cleaning apparatus, the discharge electrode (7) and the ground electrode (8) are securely partitioned by the cavities (6). When a voltage from a high voltage generator (9) is applied to between the discharge electrode (7) and the ground electrode (8), plasma resulting from corona discharges occurs in each individual cavity (6) without arising directly across the discharge electrode (7) and the ground electrode (8). The exhaust gas is thereby cleaned up.

11 Claims, 7 Drawing Sheets

PLASMA TYPE EXHAUST GAS CLEANING APPARATUS

BACKGROUND OF THE INVENTION

1. Field of the Invention

The present invention relates to a plasma type exhaust gas cleaning apparatus in which voltage is applied across a discharge electrode and a ground electrode to create a corona discharge field and the exhaust gas emitted from combustion equipment, such as an engine, is passed through between these electrodes for cleanup.

2. Description of the Related Art

A plasma type exhaust gas cleaning apparatus of this kind is disclosed, for example, in Japanese Patent Laid-Open Publication No.Hei 5-59934. In this plasma type exhaust gas cleaning apparatus, a ground electrode is arranged cylindrically around a linear discharge electrode to constitute a corona discharge tube. The corona discharge tube is arranged on the exhaust path from an engine. Under engine operation, this plasma type exhaust gas cleaning apparatus passes the exhaust gas from the engine through the interior of the cylindrical ground electrode while applying a predetermined voltage from a high voltage generator to between the electrodes. This creates a corona discharge field to produce plasma, which cleans up the exhaust gas. Besides, this plasma type exhaust gas cleaning apparatus has a number of dielectric grains or pellets which are filled into between the electrodes so that electric discharges occur at short ranges between adjoining dielectrics for the sake of uniformity in electric field.

By the way, because such a plasma type exhaust gas cleaning apparatus had the dielectrics of grain or pellet form, the discharge electrode and the ground electrode were in communication with each other through slight gaps between dielectrics. In this case, the plasma from corona discharges threaded through the dielectrics to extend chiefly between the electrodes, hardly occurring between dielectrics. Accordingly, the plasma type exhaust gas cleaning apparatus could not provide a field of adequate uniformity. Thus, in the areas of lower plasma densities such as the vicinity of the outer ground electrode, exhaust gas could simply pass through as uncleaned and be emitted into the air.

SUMMARY OF THE INVENTION

An object of the present invention is to provide a plasma type exhaust gas cleaning apparatus which can uniformize plasma density so that a sufficient exhaust-gas cleaning capability is exerted.

This object has been achieved by the provision of a plasma type exhaust gas cleaning apparatus according to the present invention. The apparatus comprises a dielectric arranged in an exhaust path, between a discharge electrode and a ground electrode. The dielectric has a plurality of independent cavities for allowing exhaust gas to flow through.

When each cavity in the dielectric is thus formed independently, the discharge electrode and the ground electrode are partitioned with reliability so that the corona-discharge plasma occurs in each individual cavity without arising directly across the discharge electrode and the ground electrode. This results in shorter discharge ranges, obtaining plasma of uniform density between the electrodes.

Thus, the exhaust-gas cleaning capability can be exerted sufficiently.

The plurality of independent cavities are arranged along the direction across the electrodes. Then, the expression $$V \geq Ea \times (Ds \times \epsilon a / \epsilon s + Da) \times R$$

is satisfied, where V is an impressed voltage required for a discharge between the discharge electrode and the ground electrode, Ea is an electric field required for ionization (decomposition of exhaust gas) acting on each of the cavities, $\epsilon a$ is the permittivity of each of the cavities, $\epsilon s$ is the permittivity of the dielectric, Da is the total thickness of the cavities in the direction across the electrodes, Ds is the total thickness of the dielectric in the direction across the electrodes, and R is a relative gas density correlating to temperature and pressure.

Accordingly, the total thicknesses Da and Ds of the cavities and the dielectric, the impressed voltage V across the electrodes, and others are put into an ideal relationship.

Thus, detriments such as unnecessary power consumption resulting from improper setting can be suppressed while plasma is generated with reliability, so that the exhaust-gas cleaning function is exercised sufficiently.

Alternatively, either one electrode out of the discharge electrode and ground electrode is formed in a linear shape, and the other electrode is formed in a cylindrical shape and arranged with the one electrode at the center. The dielectric is composed of a plurality of cylindrical dielectric layers arranged between the electrodes, concentrically around the one electrode out of the electrodes. The plurality of independent cavities are composed of a plurality of independent, cylindrical cavity layers formed between the plurality of dielectric layers. Then, the expression $$V \geq Ea \times \{\epsilon am \times (ra2m - ra1m) / ln(ra2m/ra1m)\} \times R \times \Sigma \{ln(ra2n/ra1n) / \epsilon an + ln(rs2k/rs1k) / \epsilon sk\}$$

is satisfied for an m-th cavity layer, where V is an impressed voltage required for a discharge between the discharge electrode and the ground electrode, Ea is an electric field required for ionization (decomposition of exhaust gas) acting on each of the cavity layers, $\Sigma$ is a total sum under n=1–N and k=1–K on the assumption that N is the number of cavity layers between the electrodes and K is the number of the dielectric layers, $\epsilon an$ is the permittivity of an n-th cavity layer, $\epsilon sk$ is the permittivity of a k-th dielectric layer, $\epsilon am$ is the permittivity of the m-th cavity layer, ra1n is the inner radius of the n-th cavity layer, ra2n is the outer radius of the n-th cavity layer, rs1k is the inner radius of the k-th dielectric layer, rs2k is the outer radius of the k-th dielectric layer, ra1m is the inner radius of the m-th cavity layer, ra2m is the outer radius of the m-th cavity layer, and R is a relative gas density correlating to temperature and pressure.

Accordingly, the radii ra1n, ra2n, rs1k, and rs2k of the cavity layers and the dielectric layers, the impressed voltage V across the electrodes, and others are put into an ideal relationship.

Therefore, as has been described, detriments such as unnecessary power consumption resulting from improper setting can be suppressed while plasma is generated with reliability. Thus the exhaust-gas cleaning function is exercised sufficiently.

Alternatively, either one electrode out of the discharge electrode and ground electrode is formed in a linear shape, and the other electrode is formed in a cylindrical shape and arranged with the one electrode at the center. The dielectric is composed of a plurality of cylindrical dielectric layers arranged between the electrodes, concentrically around the one electrode out of the electrodes. The plurality of independent cavities are composed of a plurality of independent, cylindrical cavity layers formed between the plurality of dielectric layers. Then, field adjusting portions for occupying a circumferential proportion are arranged in the cavity layers so that inner cavity layers are higher than outer cavity layers in permittivity.

Such an arrangement of field adjusting portions in the individual cavities makes inner cavities higher than outer cavities in permittivity, whereby the cavities increase in capacitance and decrease in electric field toward the inner side.

This makes it possible to suppress radial variations in electric field resulting from the structure of electrode arrangement, thereby allowing uniform plasma density for the sake of higher exhaust-gas cleaning capability.

Alternatively, either one electrode out of the discharge electrode and ground electrode is formed in a linear shape, and the other electrode is formed in a cylindrical shape and arranged with the one electrode at the center. The dielectric is composed of a plurality of cylindrical dielectric layers arranged between the electrodes, concentrically around the one electrode out of the electrodes. The plurality of independent cavities are composed of a plurality of independent, cylindrical cavity layers formed between the plurality of dielectric layers. Here, the radial thicknesses of the cavity layers are smaller on the outer side than on the inner side.

When outer cavities are thus made smaller in thickness, the outer cavities decrease in the flow rate of exhaust gas and then increase in the residence time of exhaust gas, the exhaust gas being subjected to the plasma's cleaning function for longer periods.

This can suppress radial differences in the cleaning function, thereby realizing yet higher cleaning capability.

Alternatively, either one electrode out of the discharge electrode and ground electrode is formed in a linear shape, and the other electrode is formed in a cylindrical shape and arranged with the one electrode at the center. The dielectric is composed of a plurality of cylindrical dielectric layers arranged between the electrodes, concentrically around the one electrode out of the electrodes. The plurality of independent cavities are composed of a plurality of independent, cylindrical cavity layers formed between the plurality of dielectric layers. Then, protruded portions extending into the cavity layers are arranged on the surfaces of the dielectric layers so that their densities of arrangement are higher on outer dielectric layers than on inner dielectric layers.

When the protruded portions for functioning as portions of nonuniform fields are thus arranged on the surfaces of the dielectrics with their densities of arrangement higher on the outer side, where discharge starting voltage tends to rise with an increase in the radius of curvature, than on the inner side, the starting voltage is uniformized in radial directions.

This allows the voltage applied across the electrodes to act on each cavity uniformly, thereby realizing yet higher exhaust-gas cleaning capability.

Further scope of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompany drawings which are given by way of illustration only, and thus, are not limitative of the present invention, and wherein.

DETAILED DESCRIPTION OF THE PREFERRED EMBODIMENTS

[First Embodiment]

Hereinafter, description will be given of the first embodiment of the plasma type exhaust gas cleaning apparatus that practices the present invention.

Figure 1:
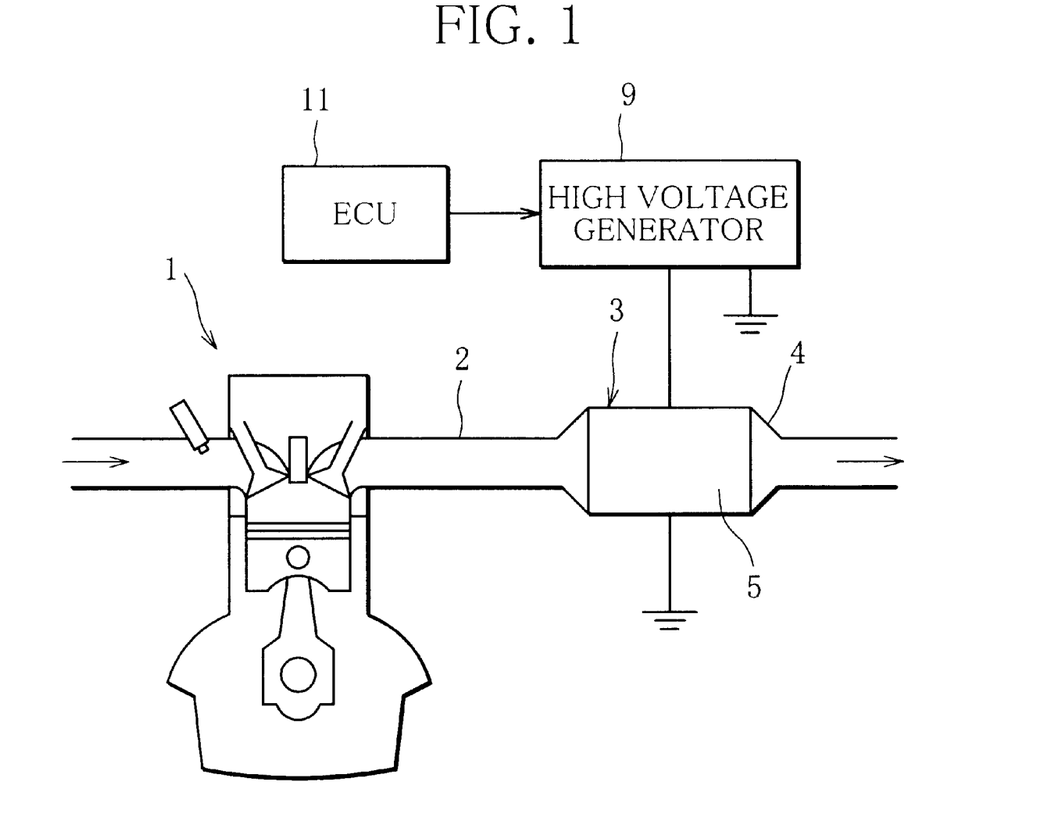
FIG. 1 is a block diagram showing the entire system of the plasma type exhaust gas cleaning apparatus according to a first embodiment.
Figure 2:
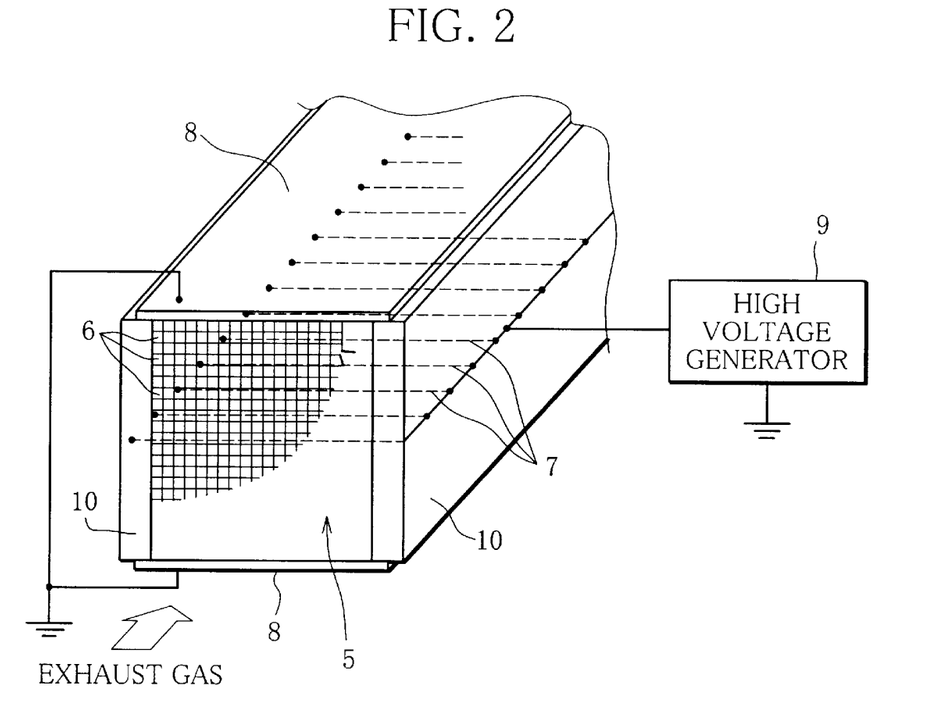
FIG. 2 is a perspective view showing the configuration of the dielectric and electrodes in a corona discharge tube.

FIG. 1 is a block diagram showing the entire system of the plasma type exhaust gas cleaning apparatus according to the first embodiment. FIG. 2 is a perspective view showing the configuration of the dielectric and electrodes in a corona discharge tube.

As shown in these diagrams, a corona discharge tube 3 is placed on the exhaust path 2 of car-mounted combustion equipment, or an engine 1. The exhaust gas from the engine 1 is passed through the corona discharge tube 3. A casing 4 of the corona discharge tube 3 contains a dielectric 5, such as alumina, in a rectangular solid configuration as a whole.

The dielectric 5 has a number of cavities 6 which are rectangular in cross section and arranged in a matrix. The cavities 6 each are surrounded by grid-like walls made of the dielectric 5 (hereinafter, referred to as dielectric layers) so as to create closed spaces independently. Besides, the cavities 6 are shaped so that the exhaust gas passes through the dielectric in the flowing direction of the exhaust gas. That is, the upstream and downstream sides of the casing 4 communicate with each other through the cavities 6.

As shown in FIG. 2, a number of linear discharge electrodes 7 are arranged in a row, near the vertical center of the dielectric 5 along the flowing direction of the exhaust gas. These discharge electrodes 7 are embedded in the dielectric 5. The discharge electrodes 7 each extend across the width of the dielectric 5, with one ends thereof connected together to a high voltage generator 9. In addition, flat ground electrodes 8 are provided on the top and bottom surfaces of the dielectric 5. These ground electrodes 8 are linked and grounded together. Incidentally, both right and left sides of the dielectric 5 are covered with insulators 10. As mentioned above, the individual cavities 6 are independent of each other, being surrounded by dielectric layers of the dielectric 5. Therefore, the discharge electrodes 7 at the center and the ground electrodes 8 on the top and bottom are securely partitioned by the cavities 6 with no communication therebetween.

An ECU (electronic control unit) 11 is connected to the high voltage generator 9 mentioned above. Under the commands from this ECU 11, the high voltage generator 9 generates a predetermined voltage and applies the same to the discharge electrodes 7. Incidentally, this ECU 11 also controls the engine 1, a not-shown automatic transmission, and the like.

In the plasma type exhaust gas cleaning apparatus configured thus, the engine 1 starts operating under a driver's starting operation while the exhaust gas from the engine 1 is introduced through the exhaust path 2 into the casing 4 of the corona discharge tube 3. The exhaust gas flows through the cavities 6 in the dielectric 5 before emitted into the air through a muffler (not shown). Then, while this engine 1 is in operation, the ECU 11 issues commands to the high voltage generator 9 so that a predetermined voltage is generated and applied to the discharge electrodes 7. As a result, a corona discharge field is formed between the discharge electrodes 7 and the top and bottom ground electrodes 8, thereby exerting the exhaust gas cleaning function.

In the exhaust gas cleaning apparatus of the present embodiment, the independent formation of the individual cavities 6 in the dielectric 5 as described above establishes the sure partition between the discharge electrodes 7 and the ground electrodes 8. On this account, the corona-discharge plasma is prevented from occurring directly across the discharge electrodes 7 and the ground electrodes 8 as described, e.g., in Japanese Patent Laid-Open Publication No.Hei 5-59934. Then, the plasma occurs separately in the individual cavities 6 with extremely small ranges of discharge. This results in the plasma of uniform density (i.e., uniform electric field) between the discharge electrodes 7 and the ground electrodes 8.

Moreover, when the dielectric 5 is arranged thus between the discharge electrodes 7 and the ground electrodes 8 to cause discharges within the individual cavities 6, higher impressed fields can be obtained under the same impressed voltage V, with an improvement to the cleaning capability. The reason for this will be described hereinafter.

Figure 3:
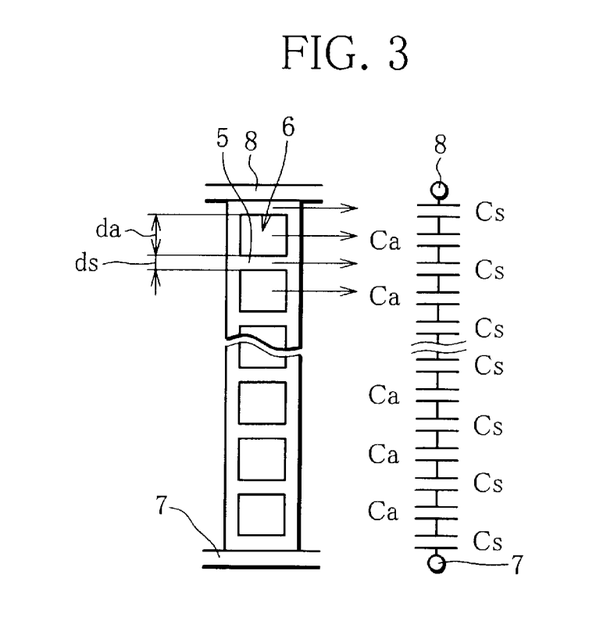
FIG. 3 is an explanatory diagram showing the relation between cavity layers and dielectric layers in an equivalent circuit.

FIG. 3 is a diagram showing the relation between the cavities 6 and the dielectric layers in an equivalent circuit. As shown in this diagram, the layers of the cavities 6, or cavity layers, and the dielectric layers of the dielectric 5 are arranged alternately in the directions from the discharge electrodes 7 to the ground electrodes 8 (the vertical direction, in FIG. 3). Thus, assuming that the thickness of each cavity layer is da and the thickness of each dielectric layer is ds, the relation therebetween can be represented by an equivalent circuit that consists of capacitors having a capacitance Ca equivalent to that of each cavity layer (the exhaust gas flowing through the cavities 6, in fact) and capacitors having a capacitance Cs equivalent to that of each dielectric layer.

Here, let N stand for the number of cavity layers in the inter-electrode direction, K for the number of dielectric layers, V for the voltage applied between the discharge electrodes 7 and the ground electrodes 8, Va for the voltage applied across each cavity layer, and Vs for the voltage applied across each dielectric layer, then the impressed voltage V is given by the following expression (1):

$$V = K \times Vs + N \times Va. \tag{1}$$

Since a charge Q is identical in any cavity layer or dielectric layer, the following expression (2) is obtained under the known expression Q=CV:

$$V = K \times Q/Cs + N \times Q/Ca. \tag{2}$$

Assuming here that Q=Ca×Va in a cavity layer, the following expressions (3) and (4) are derived:

$$V = \{K/Cs + N/Ca\} \times (Ca \times Va), \tag{3}$$

$$Va = (1/Ca)/\{K/Cs + N/Ca\} \times V. \tag{4}$$

Assuming here that the permittivity of the cavity layers is $\epsilon a$ and the permittivity of the dielectric layers is 68 s, the following expression (5) is obtained under the known expression C=2πε/d:

$$Va = (da/\epsilon a)/\{K \times ds/\epsilon s + N \times da/\epsilon a\} \times V. \tag{5}$$

Furthermore, since the impressed field Ea required for ionization (decomposition of exhaust gas) acting on a cavity layer can be expresses as Ea=Va/da, the following expression (6) is derived:

$$Ea = (1/\epsilon a)/\{K \times ds/\epsilon s + N \times da/\epsilon a\} \times V. \tag{6}$$

Then, the total thickness Da of the cavity layers in the inter-electrode direction is expressed as Da=da×N and the total thickness Ds of the dielectric layers in the inter-electrode direction is Ds=ds×(N+1), the following expression (7) is derived:

$$Ea = \epsilon s/(Ds \times \epsilon a + Da \times \epsilon s) \times V. \tag{7}$$

Now, an average impressed field E0 for situations where the dielectric 5 is not arranged between the electrodes can be expressed as E0=V/(Ds+Da). Under this expression, V is eliminated from the expression (7) to obtain the following expression (8):

$$Ea = (Ds+Da)/(Ds \times \epsilon a/\epsilon s + Da) \times E0. \tag{8}$$

Here, under normal circumstances, the ratio $\epsilon a/\epsilon s$ between the permittivity of the exhaust gas and the permittivity of the dielectric 5 is not less than "1." For example, when the dielectric 5 is alumina, $\epsilon a/\epsilon s=10$ or so. Thus $\epsilon a/\epsilon s<1$, or Ea>E0, holds all the time.

That is, the arrangement of the dielectric 5 as in the exhaust gas cleaning apparatus of the present embodiment can offer higher electric fields under the same impressed voltage V.

Now, the expression (7) modifies with the assumption of Ea=10 to obtain the following expression (9):

$$V \geq 10 \times (Ds \times \epsilon a/\epsilon s + Da) \times R. \tag{9}$$

Here, R is a relative gas density correlating to temperature and pressure with a gas density of 1 at 1 atmospheric pressure and a room temperature (300K)

That is, the total thicknesses Da and Ds of the cavity and dielectric layers, the impressed voltage V across the electrodes, and others can be adjusted to satisfy the expression (9) so that these values are maintained in an ideal relationship. For example, when the total thicknesses Da and Ds are predetermined, the expression (9) gives the minimum appropriate impressed voltage V required to form the corona discharge field. On the other hand, when there is an upper limit to the supply voltage because of car specifications or the like, the total thicknesses Da and Ds appropriate for the formation of the corona discharge field can be set based on that voltage.

As described above, in the plasma type exhaust gas cleaning apparatus according to the first embodiment, a number of independent cavities 6 are formed in the dielectric 5. Therefore, applying a voltage between the electrodes can produce plasma at extremely short ranges within the individual cavities 6, achieving uniform plasma density. This can preclude the passing-by of uncleaned exhaust gas, thereby exerting a sufficient cleaning function.

In addition, as described in conjunction with the expression (8), the provision of the dielectric 5 results in an impressed field Ea that is higher than the average impressed field E0 with no dielectric 5 under the same impressed voltage V. This means a total improvement to the cleaning capability.

Setting the total thicknesses Da and Ds of the cavities and dielectric layers, the impressed voltage V across the electrodes, and others so as to satisfy the expression (9) can establish an ideal relationship among these values. Therefore, detriments such as unnecessary power consumption resulting from improper setting can be suppressed while plasma is surely generated for the sake of the exhaust gas cleaning function.

[Second Embodiment]

Hereinafter, description will be given of the second embodiment of the plasma type exhaust gas cleaning apparatus that practices the present invention.

Figure 4:
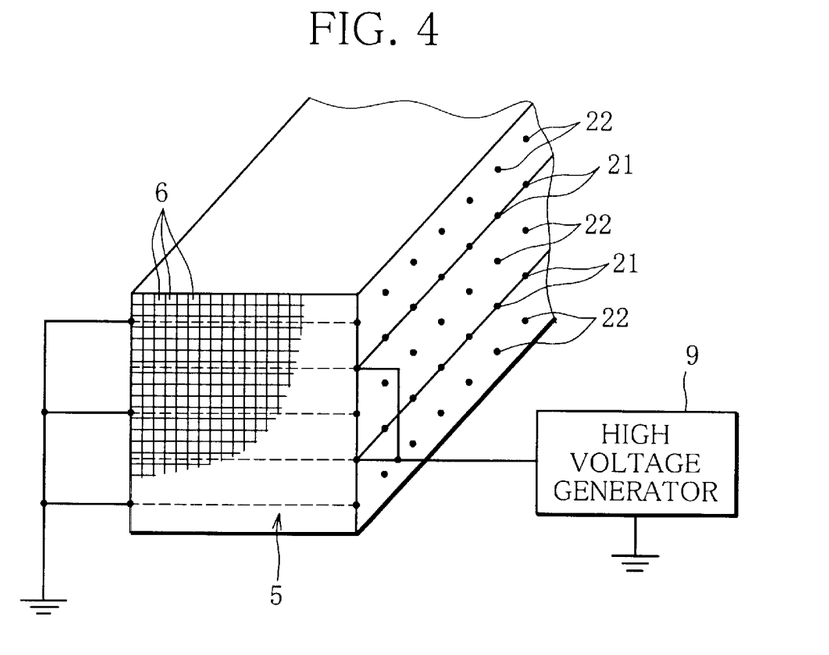
FIG. 4 is a perspective view showing a second embodiment with modified electrode arrangement.

As compared with that of the first embodiment, the exhaust gas cleaning apparatus of the second embodiment differs in the configuration of the discharge electrodes 7 and the ground electrodes 8. Therefore, description will be omitted of the same parts as those of the first embodiment and emphasis will be laid on the points of difference.

FIG. 4 is a perspective view showing the configuration of the dielectric and electrodes in the plasma type exhaust gas cleaning apparatus according to the second embodiment. As shown in this diagram, the plasma type exhaust gas cleaning apparatus of the present invention has linear ground electrodes 22 which are provided in the same fashion as discharge electrodes 21, or in a plurality of rows along the flowing direction of the exhaust gas. Besides, these discharge and ground electrodes 21 and 22 are arranged vertically alternately. That is, there is formed a multilayer structure of electrodes (e.g., two layers of discharge electrodes with three layers of ground electrodes). The discharge electrodes 21 each are connected to the high voltage generator 9. The ground electrodes 22 each are grounded.

As in the first embodiment, the exhaust gas cleaning apparatus of this configuration produces plasma within the individual cavities 6 in the dielectric 5, thereby achieving uniform plasma density. This offers a sufficient cleaning capability. Moreover, higher impressed fields Ea can be obtained under the same impressed voltage V, meaning a total improvement in the cleaning capability.

[Third Embodiment]

Hereinafter, description will be given of the third embodiment of the plasma type exhaust gas cleaning apparatus that practices the present invention.

Figure 5:
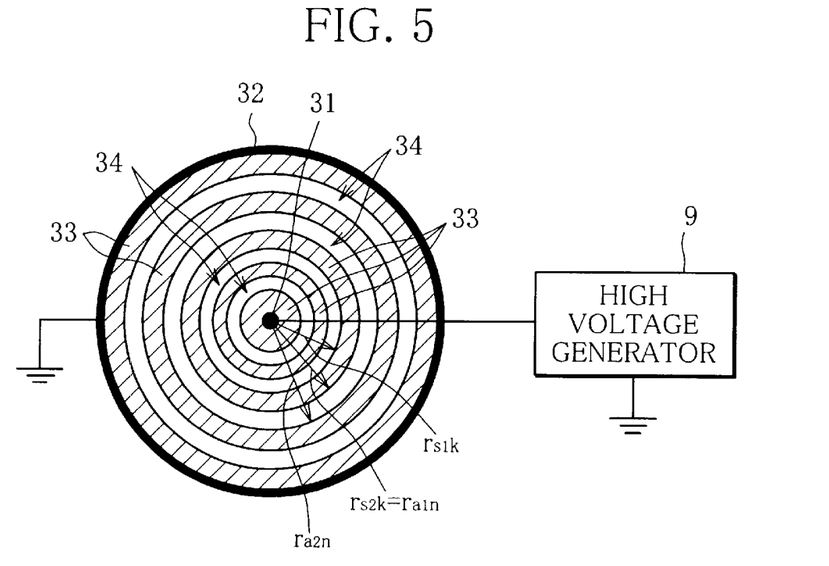
FIG. 5 is a sectional view showing the configuration of the dielectrics and electrodes in the plasma type exhaust gas cleaning apparatus according to a third embodiment.

FIG. 5 is a sectional view showing the configuration of the dielectrics and electrodes in the plasma type exhaust gas cleaning apparatus according to the third embodiment. As shown in this diagram, the plasma type exhaust gas cleaning apparatus of the present embodiment has a cylindrical ground electrode 32 around a single linear discharge electrode 31. The discharge electrode 31 is connected to a high voltage generator 9. The ground electrode 32 is grounded. In addition, a number of cylindrical dielectrics 33 made of alumina or the like are arranged between the discharge electrode 31 and the ground electrode 32, concentrically around the discharge electrode 31. Cylindrical cavities 34 are formed between the individual dielectrics 33 independent of each other. That is, a number of dielectrics 33 form dielectric layers, and a number of cavities 34 cavity layers. The exhaust gas from the engine 1 flows through the interiors of the cavities 34.

In the plasma type exhaust gas cleaning apparatus configured thus, the engine 1 is started by a driver's starting operation. Then, under the commands from the ECU 11, the high voltage generator 9 generates a predetermined voltage and applies the same to the discharge electrode 31. As a result, a corona discharge field is formed between the discharge electrode 31 and the ground electrode 32, thereby exerting the exhaust gas cleaning function.

Like the first embodiment, the exhaust gas cleaning apparatus of the present embodiment is provided with the cavities 34 each formed independently, which secures the partition between the discharge electrode 31 and the ground electrode 32. Prevented from occurring directly across the discharge electrode 31 and the ground electrode 32, the corona-discharge plasma thus occurs in the individual cavities 34 with short discharge ranges. This results in the plasma of uniform density between the discharge electrode 31 and the ground electrode 32.

As in the first embodiment, the relations among the cavity layers, the dielectric layers, and the impressed voltage V in the present embodiment can also be optimized on the basis of expressions. The procedures will be described hereinafter.

Even in the present embodiment, the cavity layers of the cavities 34 and the dielectric layers of the dielectrics 33 are arranged alternately when seen in the directions from the discharge electrode 31 to the ground electrode 32 (in this case, the radial directions).

Here, let N and K stand for the numbers of cavity layers and dielectric layers, respectively, Σ for a total sum under n=1–N and k=1–K, Van for the impressed voltage across an n-th cavity layer, and Vsk for the impressed voltage across a k-th dielectric layer. Then, the impressed voltage V across the electrodes is given by the following expression (10):

$$V = \Sigma(Van + Vsk). \tag{10}$$

Assuming that the capacitance across an n-th cavity layer is Can and the capacitance across a k-th dielectric layer is Csk, the following expression (11) is obtained the known expression Q=CV:

$$V = Q \times \Sigma(1/Can + 1/Csk). \tag{11}$$

Additionally, assume that the permittivity of an n-th cavity layer is εan, the permittivity of a k-th dielectric layer is εsk, the inner radius of the n-th cavity layer is ra1n, the outer radius of the n-th cavity layer is ra2n, the inner radius of the k-th dielectric layer is rs1k, the outer radius of the k-th dielectric layer is rs2k (rs2k=ra1k if the dielectric layer exists outside the inner electrode), the inner radius of an m-th cavity layer is ra1m, the outer radius of the m-th cavity layer is ra2m, the capacitance of the m-th layer is Cm=$2\pi\epsilon$m/ln (r2m/r1m), and Q=Cam×Vam. Then, the following expression (12) is derived:

$$V=\Sigma\{ln(ra2n/ra1n)/\epsilon an+ln(rs2k/rs1k)/\epsilon sk\}\times\{\epsilon am/ln(ra2m/ra1m)\}\times Vam. \quad (12)$$

Since the electric field Eam required for ionization (decomposition of exhaust gas) acting on an m-th cavity layer can be expressed as Eam=Vam/(ra2m−ra1m), the expression (12) gives the following expression (13):

$$V=\Sigma\{ln(ra2n/ra1n)/\epsilon an+ln(rs2k/rs1k)/\epsilon sk\}\times\{\epsilon am\times(ra2m-ra1m)/ln(ra2m/ra1m)\}\times Eam. \quad (13)$$

Now, the expression (13) is modified with the assumption of Eam=10 to obtain the following expression (14):

$$V\geq 10\times\{\epsilon am\times(ra2m-ra1m)/ln(ra2m/ra1m)\}\times R\times\Sigma\{ln(ra2n/ra1n)/\epsilon an+ln(rs2k/rs1k)/\epsilon sk\}. \quad (14)$$

This gives the relations among the radii ra1n and ra2n of each cavity layer, the radii rs1k and rs2k of each dielectric layer, the impressed voltage V across the electrodes, and so forth.

As described above, in the plasma type exhaust gas cleaning apparatus according to the third embodiment, the partitioning by the dielectrics 33 makes the individual cavities 34 independent of each other. Therefore, applying a voltage between the electrodes can produce plasma within the individual cavities 34, achieving uniform plasma density. This can preclude the passing-by of uncleaned exhaust gas, thereby exerting a sufficient cleaning function.

Then, setting the radii ra1n and ra2n of each cavity layer, the radii rs1k and rs2k of each dielectric layer, and the impressed voltage V across the electrodes so as to satisfy the expression (14) can establish an ideal relationship among these values. Therefore, detriments such as unnecessary power consumption resulting from improper setting can be suppressed while plasma is surely generated for the sake of the exhaust gas cleaning function.

[Fourth Embodiment]

Hereinafter, description will be given of the fourth embodiment of the plasma type exhaust gas cleaning apparatus that practices the present invention.

Figure 6:
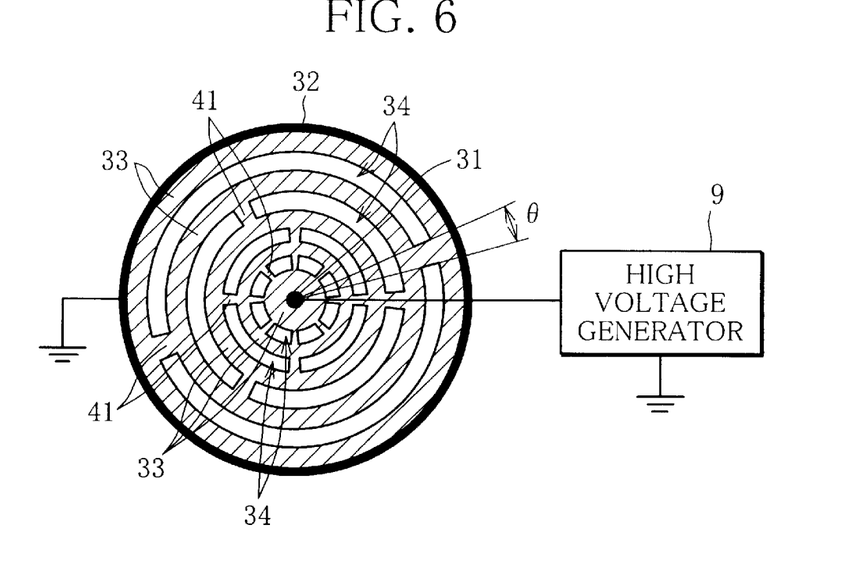
FIG. 6 is a sectional view showing the configuration of the dielectrics and electrodes in the plasma type exhaust gas cleaning apparatus according to a fourth embodiment.

The exhaust gas cleaning apparatus of the fourth embodiment differs from that of the third embodiment in the configuration of the dielectrics 33. Thus description will be omitted of the same parts as those of the third embodiment and emphasis will be laid on the points of difference.

FIG. 6 is a sectional view showing the configuration of the dielectrics and electrodes in the plasma type exhaust gas cleaning apparatus according to the fourth embodiment. As shown in this diagram, the plasma type exhaust gas cleaning apparatus of the present embodiment has field adjusting portions 41 of alumina, which are arranged partially in each cavity 34. These field adjusting portions 41 can be formed integrally at the time of fabrication of the dielectrics 33, so as to link inner and outer dielectrics 33. Alternatively, the field adjusting portions 41 and the dielectrics 33 may be provided separately.

The field adjusting portions 41 are formed along the length of the dielectrics 33 in the axial direction (the flowing direction of the exhaust gas). In the circumferential direction of the dielectrics 33, each of the field adjusting portions 41 is formed within the range of an angle è with the discharge electrode 31 at the center. That is, the individual field adjusting portions 41 occupy the same proportion to the respective cavities 34. Thus the field adjusting portions 41 each have an equal influence on the respective cavities 34. The numbers of field adjusting portions 41 in the cavities 34 are determined, for example, as 2, 3, 4, and 8 in order from the outer side; that is, the inner the more.

Hereinafter, description will be given of the operation of the fourth embodiment configured thus.

As mentioned in the third embodiment above, plasma production within the individual cavities 34 can uniformize the plasma density (i.e. radial electric field) to a certain extent. The apparatus of the third embodiment, however, has a structure in which the cylindrical ground electrode 32 is arranged around the discharge electrode 31. This means a structural tendency for the capacitance to increase with the radius, lowering the electric field.

On the other hand, when high-permittivity field adjusting portions 41 are provided partially in a low-permittivity cavity 34, the overall permittivity increases for higher capacitance. Accordingly, the provision of the field adjusting portions 41 in increasing numbers to inner cavities 34 as mentioned above can make greater capacitance increases to the inner cavities 34. This can make compensation for the field variation resulting from the structural reason described above. As a result, the radial field variation can be suppressed for yet higher uniformity in plasma density, thereby realizing yet higher exhaust-gas cleaning capability. Incidentally, the above-mentioned overall permittivity means a net permittivity of the cavity 34 including the field adjusting portions 41, which corresponds to $\epsilon$an and $\epsilon$am in the foregoing third embodiment.

In FIG. 6, the plurality of field adjusting portions 41 in each cavity 34 are arranged at equal intervals along the circumferential direction. What is essential in the formation of the field adjusting portions 41 is, however, to reduce each cavity 34 for higher capacitance. Thus, for example, the field adjusting portions 41 in each cavity 34 may be formed together on a single position.

By the way, the provision of field adjusting portions 41 in the individual cavities 34 as in the present embodiment naturally decreases the cavities 34 in volume. This decrease in volume causes a drop in capacitance. Accordingly, in such a case that a great number of field adjusting portions 41 are established in inner cavities 34, the original capacitance-increasing function of the field adjusting portions 41 can be hampered on the inner side, possibly failing to provide plasma density of sufficient uniformity.

On this account, inner field adjusting portions 41 are fabricated from materials of higher permittivities (ferroelectrics) for the sake of increases in capacitance. Specifically, inner field adjusting portions 41 use, for example, such materials as barium titanate with a relative permittivity not less than 1000 and titania with a relative permittivity of the order of 100. Outer field adjusting portions 41 use such materials as quartz with a relative permittivity of the order of 3.

By this means, the capacitance variation resulting from a decrease in the volumes of the cavities 34 can be compensated so that uniform plasma density is always ensured irrespective of the numbers of field adjusting portions 41 to be established.

[Fifth Embodiment]

Hereinafter, description will be given of the fifth embodiment of the plasma type exhaust gas cleaning apparatus that practices the present invention.

Figure 7:
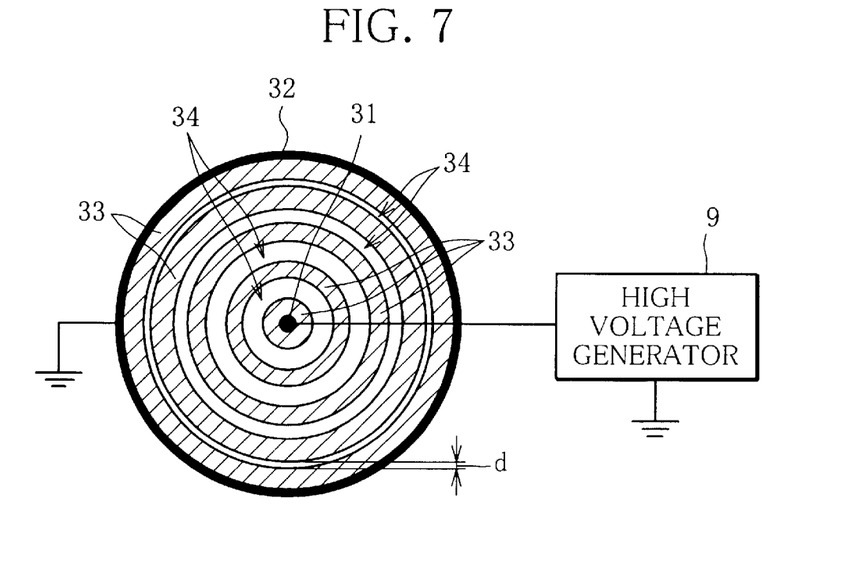
FIG. 7 is a sectional view showing the configuration of the dielectrics and electrodes in the plasma type exhaust gas cleaning apparatus according to a fifth embodiment.

The exhaust gas cleaning apparatus of the fifth embodiment differs from that of the third embodiment in the configuration of the dielectrics 33. Thus description will be omitted of the same parts as those of the third embodiment and emphasis will be laid on the points of difference.

FIG. 7 is a sectional view showing the configuration of the dielectrics and electrodes in the plasma type exhaust gas cleaning apparatus according to the fifth embodiment. As shown in this diagram, in the plasma type exhaust gas cleaning apparatus of the present embodiment, smaller radial thicknesses d are established for outer cavities 34. The other configuration is the same as that of the third embodiment.

Figure 8:
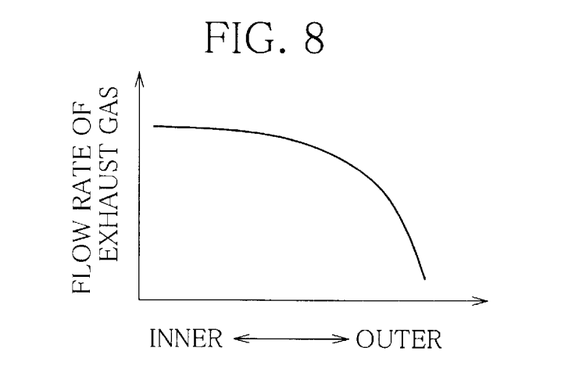
FIG. 8 is a characteristic chart showing the rate of flow of exhaust gas.

When the radial thicknesses d of the individual cavities 34 are establish to decrease toward the outer side, it follows that the outer the cavity 34 is, i.e., the smaller the thickness d is and the narrower the cavity 34 is, the more significant influence the exhaust gas flowing therethrough undergoes from its own viscosity. Then, with the decreasing rate of flow as shown in the characteristic chart of FIG. 8, the exhaust gas increases in the residence time in that cavity 34. This means that the exhaust gas undergoes the cleaning function from plasma for a longer period.

Accordingly, even though the lower fields on the outer side tend to weaken the exhaust-gas cleaning function, the decreasing-with-radius settings on the radial thicknesses d of the cavities 34 make it possible to suppress the radial variations in the cleaning function, thereby achieving yet higher exhaust-gas cleaning capability.

Figure 9:
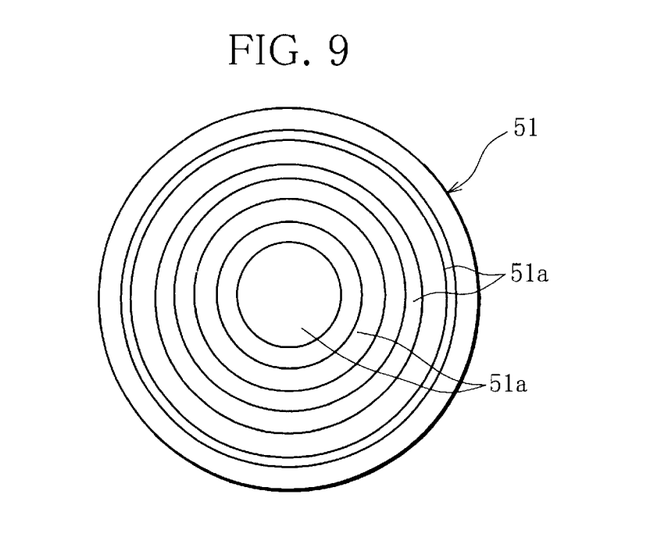
FIG. 9 is a front view showing a modified example of the fifth embodiment with a flow regulating plate.

In FIG. 7, the rate of flow of the exhaust gas is regulated by changing the thicknesses d of the individual cavities 34. Alternatively, for example, all the cavities 34 may be set in identical thickness as in the third embodiment while a flow regulating plate 51 as shown in FIG. 9 is arranged on the upstream side of the dielectrics 33. The flow regulating plate 51 has annular holes 51a of concentric configuration, having widths decreasing toward the outer side. By this means, the same flow regulating function as the one described above is effected.

[Sixth Embodiment]

Hereinafter, description will be given of the sixth embodiment of the plasma type exhaust gas cleaning apparatus that practices the present invention.

Figure 10:
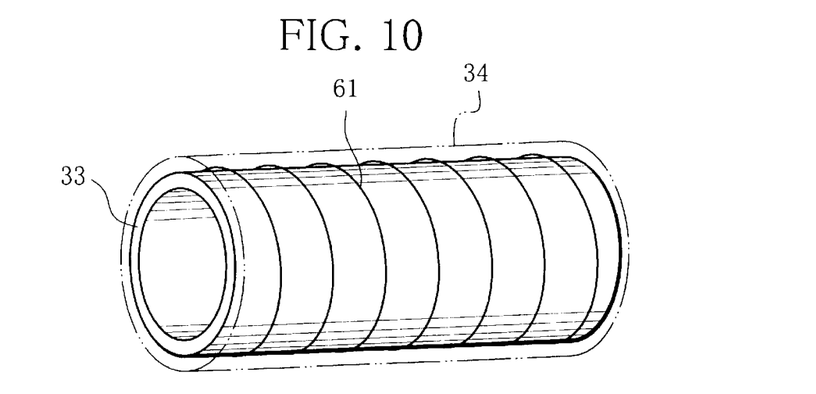
FIG. 10 is a perspective view showing a wire being wound in the plasma type exhaust gas cleaning apparatus according to a sixth embodiment.

The exhaust gas cleaning apparatus of the sixth embodiment differs from that of the third embodiment in the configuration of the dielectrics 33. Thus description will be omitted of the same parts as those of the third embodiment and emphasis will be laid on the points of difference.

FIG. 10 is a perspective view showing the configuration of the dielectric and electrodes in the plasma type exhaust gas cleaning apparatus according to the sixth embodiment. As shown in this diagram, the plasma type exhaust gas cleaning apparatus of the present embodiment has wires 61 which are wound around the outer peripheries of the individual dielectrics 33 in a helical fashion as protruded portions. FIG. 10 shows the outermost dielectric 33. Though omitted from the diagram, the wires 61 around the inner dielectrics 33 are wound in decreasing numbers of turns. That is, the outer the dielectric 33, the higher the density at which the wire 61 is arranged.

Hereinafter, description will be given of the operation of the sixth embodiment configured thus.

It is well known that corona discharge is harder to occur on planes and easier on protruded portions and other areas of nonuniform fields. Therefore, as is evident from FIG. 5 and others, when cylindrical dielectrics 33 are arranged concentrically, the outer dielectrics 33 become greater in the radius of curvature to get similar to planes with an increase in the tendency toward hard discharge. That is, the greater the radius, the higher the voltage required for a corona discharge (discharge starting voltage).

Figure 11:
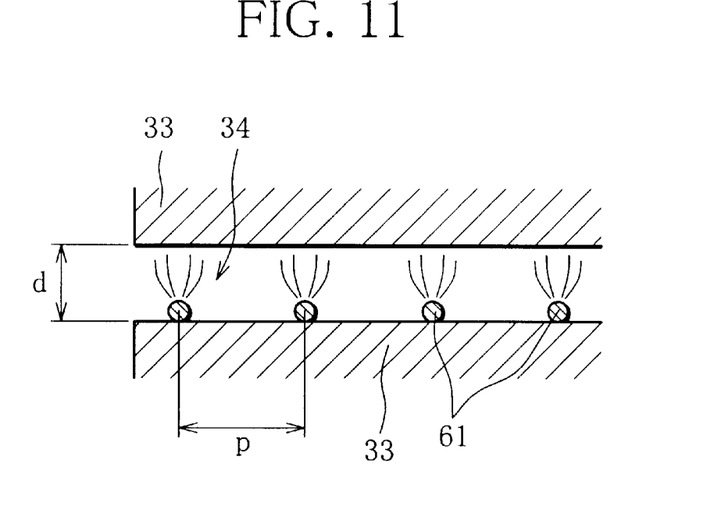
FIG. 11 is an enlarged sectional view of dielectrics, showing the relation between a cavity thickness d and a winding pitch P.

In the present embodiment, however, the wires 61 are wound as protruded portions around the outer peripheries of the individual dielectrics 33. These wires 61 function as the portions of nonuniform fields so that corona discharges are started as shown in FIG. 11. Here, the wires 61 consequently have the function of uniformizing the streamer discharge production aside from the function of lowering the discharge staring voltage. Since the wires 61 are wound in greater numbers of turns on the outer side where corona discharges are harder to occur, the discharge starting voltage is uniformized in the radial directions. As a result, the voltage impressed across the electrodes can be applied to the individual cavities 34 uniformly so that yet higher exhaust-gas cleaning capability is realized.

Now, as shown in FIG. 11, the winding pitch P of a wire is set to be greater than or equal to the thickness d of the cavity 34 in which the wire 61 is arranged (the distance from the wire 61 to the inner periphery of the dielectric 33 to emit discharge to). The reason for this is that too small a winding pitch P causes interference between the electric fields produced by adjoining wires 61 and thus leads to harder discharge.

In FIG. 10, the wires 61 are wound around the outer peripheries of the dielectrics 33 so as to function as protruded portions. Alternatively, projections may be formed integrally on the outer peripheries of the dielectrics 33 at the time of fabrication of the dielectrics 33, so that these projections function as the protruded portions. Moreover, the projections may be arranged on the inner peripheries of the dielectrics 33, in which case the same functions and effects as those described above can also be obtained.

While the description of the embodiments has been through so far, the modes of the present invention are not limited to these embodiments.

Figure 12:
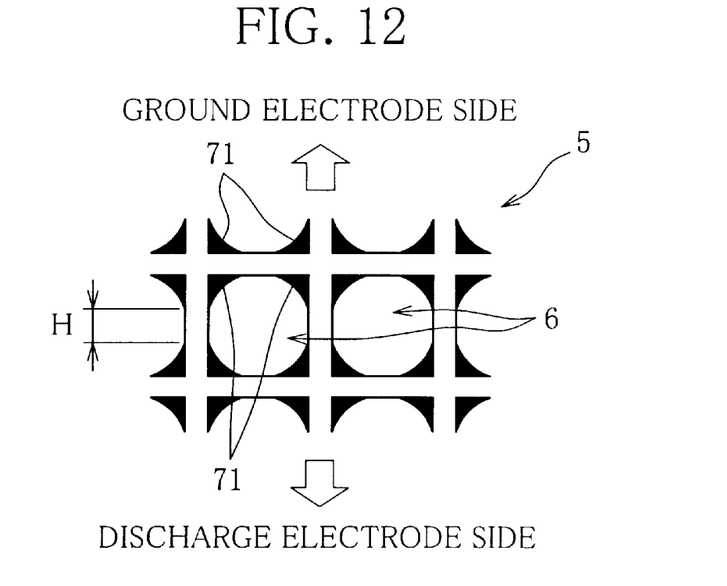
FIG. 12 is an enlarged sectional view showing a modified example in which catalyst layers are formed on a dielectric.

In the foregoing embodiments, the exhaust gas has been cleaned up by means of corona discharge alone. However, the apparatuses may be configured to combine a catalyst-based cleaning function. For example, in the case of incorporating a catalyst to the exhaust gas cleaning apparatus of the first embodiment, catalyst layers 71 are formed on the inside surfaces of each cavity 6 in the dielectric 5. Then, the exhaust gas flowing through the cavities 6 is cleaned by the catalyst, too. Incidentally, ordinary three-way catalysts, NOx catalysts, and the like are formed as full catalyst layers for the sake of maximizing the contact surfaces with exhaust gas. Nevertheless, in the cases where corona discharge fields are created inside the individual cavities 6 as in the above-described embodiments according to the present invention, the catalyst layers 71, or electric conductors, can cause shorts to hamper corona discharges if the catalyst layers are formed all over the surfaces. On this account, as shown in FIG. 12, the catalyst layers 71 are preferably segmented across sections H in the inter-electrode direction (the vertical direction in the diagram) to prevent shorts because of the catalysts 71. Moreover, FIG. 12 shows the case where the catalyst layers 71 are also segmented in the direction perpendicular to the inter-electrode direction, while the segmentation in that direction is not necessary.

Figure 13:
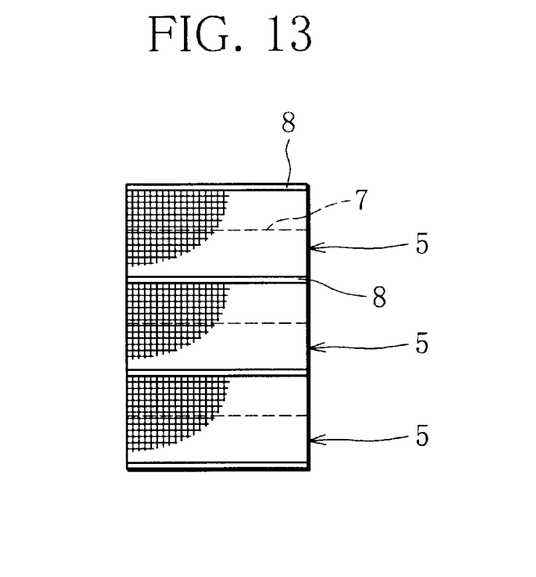
FIG. 13 is a front view showing a modified example in which a plurality of dielectrics according to the first embodiment are stacked up.
Figure 14:
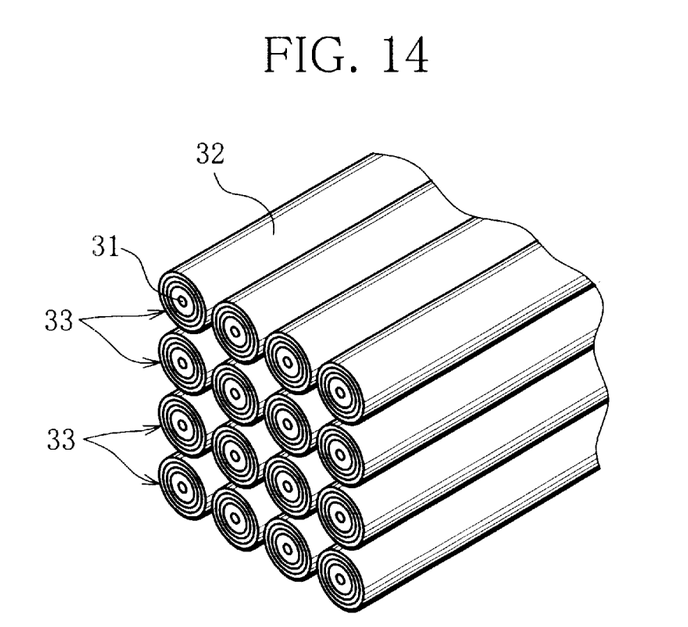
FIG. 14 is a perspective view showing a modified example in which a plurality of dielectrics according to the third embodiment are arranged vertically and horizontally.

The above-described embodiments have dealt with the cases where the exhaust gas cleaning apparatuses comprise a single unit of dielectric(s) 5, 33 (see FIGS. 2 and 5). Nevertheless, depending on conditions such as the flow rate of the exhaust gas and the cleaning capability required, a plurality of dielectrics 5 may be arranged in layers as shown in FIG. 13. A plurality of dielectrics 33 may also be arranged in a matrix as shown in FIG. 14.

In the above-described first and second embodiments, the rectangular cavities 6 are arranged vertically and horizontally. In the third through sixth embodiments, the cylindrical cavities 34 are arranged concentrically. In these cavities 6 and 34 are formed the corona discharge fields. Cavities, however, may take any shape or arrangement as long as they are separated from each other to allow a reduction in discharge range. Therefore, cavities may be formed, for example, in a honeycomb configuration which is commonly used with catalysts and the like.

Moreover, while the embodiments described above have dealt with the plasma type exhaust gas cleaning apparatuses that are targeted for the engine 1, the present invention is not limited thereto. The plasma type exhaust gas cleaning apparatuses may be targeted for any combustion equipment as long as the equipment emits exhaust gas that requires cleaning. For example, the plasma type exhaust gas cleaning apparatuses may be intended for the cleaning of the exhaust gas emitted from a plant or the like.

What is claimed is:

1. A plasma exhaust gas cleaning apparatus comprising a discharge electrode and a ground electrode arranged across an exhaust path of combustion equipment, and discharging means for applying a voltage to between said electrodes to create a corona discharge field, exhaust gas flowing through said exhaust path being cleaned by said corona discharge field;

the apparatus further comprising a dielectric arranged in said exhaust path, between said discharge electrode and said ground electrode; and said dielectric having a plurality of independent cavities arranged along the direction of voltage discharge across said electrodes, such that said plurality of independent cavities are arranged along said direction between said electrodes, for allowing said exhaust gas to flow through.

2. The apparatus according to claim 1, wherein:

the expression $$V \geq Ea \times (Ds \times \epsilon a/\epsilon s + Da) \times R$$

holds, where V is an impressed voltage required for a discharge between said discharge electrode and said ground electrode, Ea is an electric field required for ionization acting on each of said cavities, $\epsilon a$ is the permittivity of each of said cavities, $\epsilon s$ is the permittivity of said dielectric, Da is the total thickness of said cavities in the direction across said electrodes, Ds is the total thickness of said dielectric in the direction across said electrodes, and R is a relative gas density correlating to temperature and pressure.

3. The apparatus according to claim 1, wherein:

either one electrode out of said discharge electrode and ground electrode is formed in a linear shape, and the other electrode is formed in a cylindrical shape and arranged with said one electrode at the center;

said dielectric is composed of a plurality of cylindrical dielectric layers arranged between said electrodes, concentrically around said one electrode out of said electrodes;

said plurality of independent cavities are composed of a plurality of independent, cylindrical cavity layers formed between said plurality of dielectric layers; and the expression $$V \geq Ea \times \{\epsilon am \times (ra2m - ra1m)/ln(ra2m/ra1m)\} \times R \times \Sigma \{ln(ra2n/ra1n)/\epsilon an + ln(rs2k/rs1k)/\epsilon sk\}$$

holds for an m-th cavity layer, where V is an impressed voltage required for a discharge between said discharge electrode and said ground electrode, Ea is an electric field required for ionization acting on each of said cavity layers, $\Sigma$ is a total sum under n=1–N and k=1–K on the assumption that N is the number of cavity layers between said electrodes and K is the number of said dielectric layers, $\epsilon an$ is the permittivity of an n-th cavity layer, $\epsilon sk$ is the permittivity of a k-th dielectric layer, $\epsilon am$ is the permittivity of the m-th cavity layer, ra1n is the inner radius of the n-th cavity layer, ra2n is the outer radius of the n-th cavity layer, rs1k is the inner radius of the k-th dielectric layer, rs2k is the outer radius of the k-th dielectric layer, ra1m is the inner radius of the m-th cavity layer, ra2m is the outer radius of the m-th cavity layer, and R is a relative gas density correlating to temperature and pressure.

4. The apparatus according to claim 1, wherein:

either one electrode out of said discharge electrode and ground electrode is formed in a linear shape, and the other electrode is formed in a cylindrical shape and arranged with said one electrode at the center;

said dielectric is composed of a plurality of cylindrical dielectric layers arranged between said electrodes, concentrically around said one electrode out of said electrodes;

said plurality of independent cavities are composed of a plurality of independent, cylindrical cavity layers formed between said plurality of dielectric layers; and field adjusting portions for occupying a circumferential proportion are arranged in said cavity layers so that inner cavity layers are higher than outer cavity layers in permittivity.

5. The apparatus according to claim 1, wherein either one electrode out of said discharge electrode and ground electrode is formed in a linear shape, and the other electrode is formed in a cylindrical shape and arranged with said one electrode at the center;

said dielectric is composed of a plurality of cylindrical dielectric layers arranged between said electrodes, concentrically around said one electrode out of said electrodes;

said plurality of independent cavities are composed of a plurality of independent, cylindrical cavity layers formed between said plurality of dielectric layers; and the radial thicknesses of said cavity layers are smaller on the outer side than on the inner side.

6. The apparatus according to claim 1, wherein either one electrode out of said discharge electrode and ground electrode is formed in a linear shape, and the other electrode is formed in a cylindrical shape and arranged with said one electrode at the center;

said dielectric is composed of a plurality of cylindrical dielectric layers arranged between said electrodes, concentrically around said one electrode out of said electrodes;

said plurality of independent cavities are composed of a plurality of independent, cylindrical cavity layers formed between said plurality of dielectric layers; and protruded portions extending into said cavity layers are arranged on the surfaces of said dielectric layers so that their densities of arrangement are higher on outer dielectric layers than on inner dielectric layers.

7. The apparatus according to claim 1, wherein said plurality of independent cavities provide a uniform electric field between said discharge electrode and said ground electrode.

8. The apparatus according to claim 1, wherein said dielectric is positioned within a casing of a corona discharge tube.

9. The apparatus according to claim 8, wherein said plurality of independent cavities extend along the direction of exhaust gas flow through said corona discharge tube.

10. The apparatus according to claim 1, wherein said plurality of independent cavities are arranged in a matrix and each cavity has a rectangular cross section.

11. The apparatus according to claim 10, wherein a flat ground electrode extends along the top of said dielectric.

* * * * *